United States Patent
de Waal

(10) Patent No.: US 8,504,619 B1
(45) Date of Patent: Aug. 6, 2013

(54) OPERATOR-BASED SYSTEM, METHOD AND COMPUTER PROGRAM PRODUCT FOR GENERATING A CONTACT SET

(75) Inventor: Abraham B. de Waal, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1267 days.

(21) Appl. No.: 11/532,788

(22) Filed: Sep. 18, 2006

(51) Int. Cl.
*G06F 15/16* (2006.01)
*G06F 3/00* (2006.01)

(52) U.S. Cl.
USPC .......................................... 709/206; 715/762

(58) Field of Classification Search
USPC ......... 707/100–200; 709/204–207, 246–247; 715/200–277, 700–867
See application file for complete search history.

(56) References Cited

U.S. PATENT DOCUMENTS

| | | | | |
|---|---|---|---|---|
| 5,966,126 A | * | 10/1999 | Szabo | 715/762 |
| 2005/0102368 A1 | * | 5/2005 | Forman et al. | 709/207 |
| 2005/0188044 A1 | * | 8/2005 | Fleming, III | 709/206 |

\* cited by examiner

*Primary Examiner* — Afshawn Towfighi
(74) *Attorney, Agent, or Firm* — Zilka-Kotab, PC

(57) ABSTRACT

A system, method and computer program product are provided. In one embodiment, at least one parameter associated with at least one contact is received. In addition, at least one operator is received. Further, a contact set is generated based on the at least one parameter and the at least one operator. In another embodiment, an expression is received. Moreover, a contact set is generated from a plurality of contacts utilizing the expression.

28 Claims, 4 Drawing Sheets

OPERATOR-BASED SYSTEM, METHOD AND COMPUTER PROGRAM PRODUCT FOR GENERATING A CONTACT SET

FIELD OF THE INVENTION

The present invention relates to communication networks, and more particularly to communicating with a plurality of contacts over a network.

BACKGROUND

Contact sets are typically utilized in electronic message applications for distributing electronic messages (i.e. "e-mail," etc.) to a plurality of contacts. Examples of contact sets include distribution lists, mail aliases, etc. In use, such contact sets are typically generated by a user selecting a plurality of contacts that are to be grouped according to a particular parameter (e.g. geographic location, team of which each contact is a member, etc.). After such manual selection, the set of contacts are associated with a contact set name. To this end, when one desires to distribute an e-mail to the entire contact set, the user merely has to enter the contact set name into the e-mail application.

The aforementioned e-mail applications are typically limited in the manner in which such contact sets may be utilized. Just by way of example, one may desire to distribute an e-mail to contacts of a particular team that reside in a specific geographic location. Unfortunately, traditional e-mail applications are currently not capable of utilizing contact sets in a sufficiently flexible manner (e.g. to select an intersection of a first contact set and a second contact set, etc.)

There is thus a need for overcoming these and/or other problems associated with the prior art.

SUMMARY

A system, method and computer program product are provided. In one embodiment, at least one parameter associated with at least one contact is received. In addition, at least one operator is received. Further, a contact set is generated based on the at least one parameter and the at least one operator. In another embodiment, an expression is received. Moreover, a contact set is generated from a plurality of contacts utilizing the expression.

DETAILED DESCRIPTION

Figure 1:
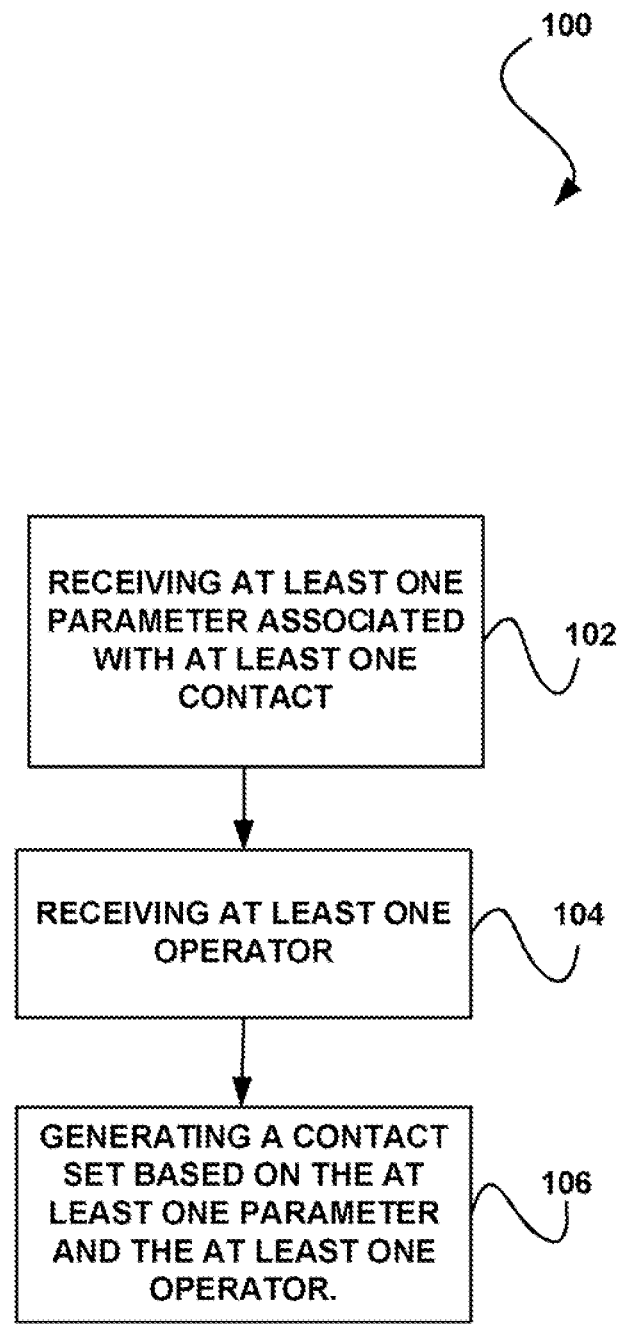
FIG. 1 shows a method for generating a contact set, in accordance with one embodiment.

FIG. 1 shows a method 100 for generating a contact set, in accordance with one embodiment. As shown in operation 102, at least one parameter associated with at least one contact is received. In the context of the present description, the contact max include any person and/or entity. Thus, in various embodiments, the contact may include an individual and/or a company, for example.

In use, the contact may be capable of receiving a communication. Further, such contact may be capable of receiving such communication utilizing any desired medium (e.g. telephone, e-mail, etc.). Just by way of example, the contact may be capable of receiving a telephone call (and associated voice message), a text message, an e-mail message, an instant message, a 2-way radio message, etc.

In the context of the present description, the at least one parameter may include any parameter capable of being associated with at least one contact. In one embodiment, the parameter may include a contact identifier (e.g. a direct contact, etc.), an identifier associated with a group of contacts, and/or at least one characteristic associated with at least one contact, for that matter. In one embodiment, the at least one parameter may be selected utilizing a graphical user interface. Of course, various embodiments involving an automatic receipt of the at least parameter are also contemplated.

For example, in one embodiment, the parameter may include a contact identifier that identifies at least one contact itself. Specifically, the parameter may optionally include an identifier (e.g. name, e-mail address, etc.) that identifies a particular contact. Thus, such identifier may be unique to the particular contact.

In other embodiments, the parameter may include a group identifier corresponding to a group of contacts. Such group of contacts may be automatically generated from a database and/or manually generated. For example, a group may be generated by simply manually generating a group identifier (e.g. name, etc.) and adding contacts in association with the group identifier (e.g. by choosing a group name and adding contacts, other group names, etc.). Of course, the group identifier may take any form.

In one aspect of the present embodiment, the group identifier may include a geographic location (e.g. zip code, state, city, country, etc.). In another embodiment, the group identifier may include a team [e.g. a management team, sales team, division, functional group, group possessing a particular profession or unique skill (e.g. software developers), etc.] of which at least one contact is a member.

Moreover, in another aspect, the group identifier may include a title of the contacts in the group. For example, the title may include an employment title (e.g. manager, staff, employee number, etc.), an organization title, etc. Of course, the title may include any identifier capable of identifying a title associated with at least one contact. For that matter, the group identifier (or even the direct contact identifier) may include an arbitrary identifier.

Still yet, at least one operator may be received, as shown in operation 104. The operator may include any operator capable of performing an operation with respect to the received at least one parameter. In one optional embodiment, the operator may include a logical operator.

In such exemplary embodiment, the logical, operator may include a union operator, whereby contacts meeting any of the parameters associated with the union operator are returned. In another example, the logical operator may include an intersection operator, whereby contacts meeting all parameters associated with the intersection operator are returned. Still yet, the logical operator may include a Boolean operator (e.g. NOT, AND, etc.).

Furthermore, the logical operator may include parentheses, for prioritizing the application of operations to parameters within the parentheses. Of course, it should be noted that any desired operators capable of being applied to at least one parameter may be utilized. In addition, the operators may be identified in any desired manner (e.g. automatically, manually, etc.). Further, the operators may or may not be identified utilizing symbols, words, plain English, etc.

In another embodiment, the operator may be selected from a plurality of operators. As an example, the operator may be selected utilizing a drop down menu displaying a plurality of pre-existing operators. As another example, the operator may be selected utilizing check boxes associated with such operators. Still yet, the operator may be selected by entering the operator into a text field. Again, the operator may be identified in any desired manner.

Furthermore, in another embodiment, the operator may be selected by a user. In one embodiment, the operator may be selected utilizing a graphical user interface (which may or may not be the same graphical user interface mentioned above). Of course, however, the operator may be received in any desired manner.

Also, in different embodiments, each operator may be associated with a priority. Thus, if a plurality of operators is received in operation 104, such operators may be applied to one or more received parameters based on the priority. In particular, the operators may be applied to the parameters in a sequential manner, such that the operators are applied in a particular order and are only applied to parameters associated therewith.

Table 1 illustrates one exemplary prioritized list of operators. It should be noted that Table 1 is set forth by way of example only, and is not to be construed as limiting in any manner.

TABLE 1

| 1. | parentheses |
|---|---|
| 2. | NOT |
| 3. | intersection |
| 4. | union |

In one embodiment, the operators may be applied to the parameters utilizing a tree structure. For example, a tree structure may be utilized to define an expression that comprises the parameters and operators. Specifically, the root of the tree may include the operator of highest priority, such that branches of the root are computed prior to the root being computed.

Still yet, a contact set is generated based on the at least one parameter and the at least one operator, as shown in operation 106. Thus, the contact set may include a subset of contacts that satisfies the operation(s), as applied to the parameter(s). In various optional embodiments, the contact set may include a distribution list, mail alias, etc.

In one optional embodiment, the contact set may be generated by querying a data structure of contacts. Specifically, the contact set may include any contacts that match the at least one parameter received in operation 102, as dictated by the at least one operator received in operation 104. In one particular example, if a user selects a Manager parameter in association with a NOT operator, all contacts that do not hold the Manager title will be returned.

In another embodiment, the parameter(s) and/or the operator(s) may be utilized to form an expression that returns a set of contacts. In particular, each contact within the returned set of contacts may match the expression. As described above, the contact set may be generated based on contacts stored within a data structure with associated parameters, etc.

Thus, in various embodiments, the selection of the parameter(s) and the operator(s) may optionally allow a user to more quickly and easily define a set of contacts. Furthermore, a user may then transmit a communication to each contact within the contact set. For example, the user may communicate with each contact within the contact set utilizing an electronic message sent by e-mail.

In another example, the user may communicate with each contact within the contact set utilizing an instant message sent by an instant messaging system. In yet another example, the user may communicate with each contact within the contact set utilizing a verbal message sent by telephone. Of course, however, any other mode of communication capable of facilitating communication between the user and each contact in the contact set may be utilized.

In one embodiment, any system adapted for carrying out the method 100 or portion thereof may or may not be integrated within an existing communications application (e.g. e-mail application, instant messaging application, telephone, etc.). In another embodiment, such logic may be independent and possibly centrally located for use by one or more applications.

More illustrative information will now be set forth regarding various optional architectures and uses of different embodiments in which the foregoing method 100 may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
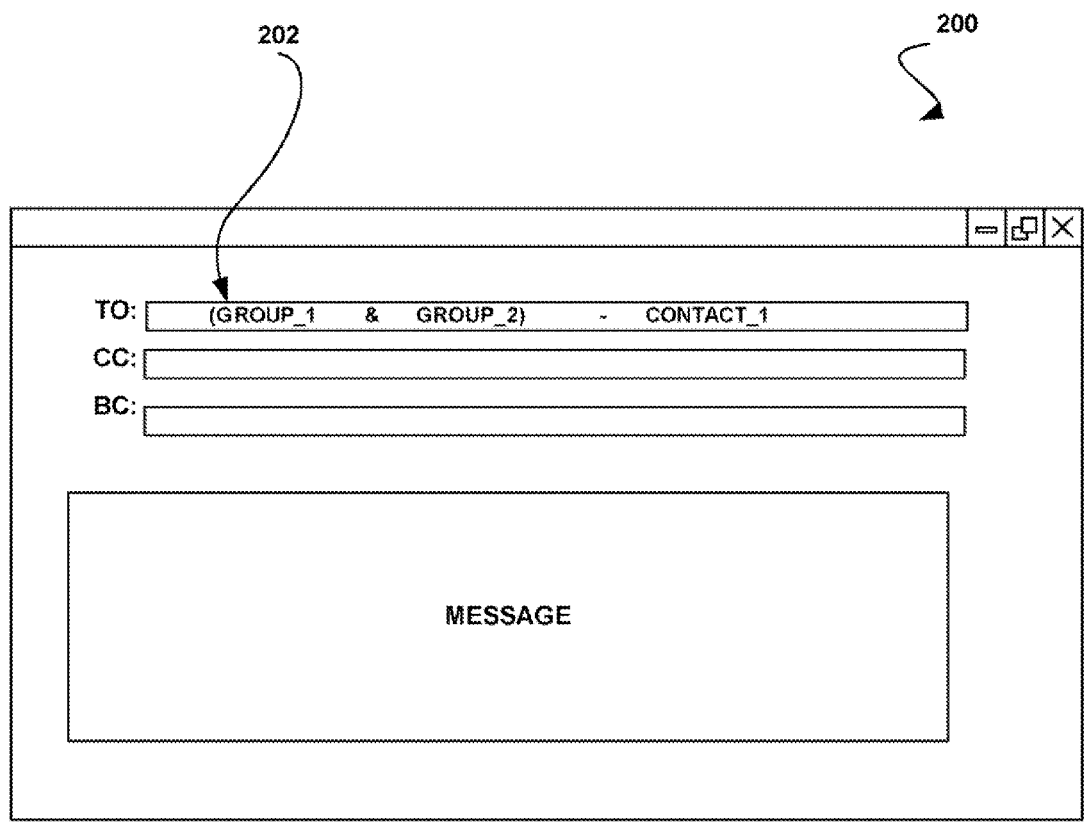
FIG. 2 shows a graphical user interface (GUI) utilized for generating a contact set, in accordance with yet another embodiment.

FIG. 2 shows a graphical user interface (GUI) 200 utilized for generating a contact set, in accordance with yet another embodiment. As an option, the GUI 200 may be implemented in the context of the details of FIGS. 1 and/or 2. Of course, however, the GUI 200 may be used in any desired environment. Again, the aforementioned definitions may equally apply to the description below.

As shown, the GUI 200 may be provided for allowing a user to generate a contact set. In one embodiment, the GUI 200 may be integrally incorporated within a communications application (e.g. e-mail application, etc.). In another embodiment, the GUI 200 may be an independent plug-in capable of being utilized in conjunction with such a communications application.

In use, the GUI 200 may allow a user to enter an expression 202, where such expression includes at least one parameter and/or at least one operator. The user may enter the expression 202 in any desired manner. For example, the user may manually type in the expression. Of course, the user may also utilize drop down boxes and/or check boxes for selecting desired parameters and operations, whereby the expression is automatically generated upon such selections. Moreover, an error message may be generated if the expression entered by the user does not return any contacts matching such expression, or renders any other type of error.

Still yet, while not illustrated, a list of contacts matching the aforementioned parameter may optionally be displayed for each parameter entered, for the convenience of the user. As another option, the list of contacts may, include a drop down list. Thus, a user may view contacts subject to the expression 202.

Table 2 illustrates operational definitions that may be utilized by a user in generating an expression. In addition, Table 3 illustrates examples of expressions that may be entered by a user utilizing parameters and such operational definitions. It should be noted, however, that such illustrations are set forth by way of example only and should not be construed as limiting in any manner.

TABLE 2

```
intersection = "&"
union = "+"
NOT = "~"
Intersect__NOT = "–" (logically A – B ⇔ A & ~B)
Parentheses = "(" and ")"
```

TABLE 3

```
Expression_01 = (Staff & ~Managers & ~Germany) + EStaff
Expression_02 = (Team01 & Team02) – Contact01
Expression_03 = Team 01 & ~Vice President
```

Once the expression 202 is entered by the user, the user may optionally be provided with a resulting contact set to check prior to initiating communication with such contact set. Thus, contacts that meet the expression 202 may be displayed to the user. The user may then manually remove and/or add contacts from such displayed contact set. In this way, the user may be capable of verifying to whom a communication is being sent. Of course, such a feature is strictly an option.

As another option, the parameter(s) and the operator(s) (and possibly the representative expression itself) may be saved for subsequently generating the contact set. For example, an expression including the parameter(s) and the operator(s) may be saved. As a further option, the expression may be saved in association with an identifier of the expression. Thus, the expression may be continuously utilized in the future.

Still yet, the expression may be saved for public purposes and/or private purposes. Thus, in one embodiment a user may choose to save the expression for personal use. The expression may therefore be saved in a local address book associated with the user. In another embodiment, the user max choose to save the expression for public use. For example, the expression may be saved in a main address book accessible to a plurality of users within a specific network.

Accordingly, the expression identifier may be selected by a user for generating the contact set associated with the particular expression. Specifically, the expression may be utilized to query a data structure of contacts each time the expression is utilized. Thus, if any contacts within a data structure are modified (e.g. added, removed, parameters changed, etc.), the expression may be utilized to return a contact set that reflects such modifications. In this way, an up-to-date contact set may be ensured each time the saved expression is utilized. In another more static embodiment, the contact set associated with an expression at a predetermined time may be stored, so that the content set associated with the saved expression remains constant over time.

Figure 3:
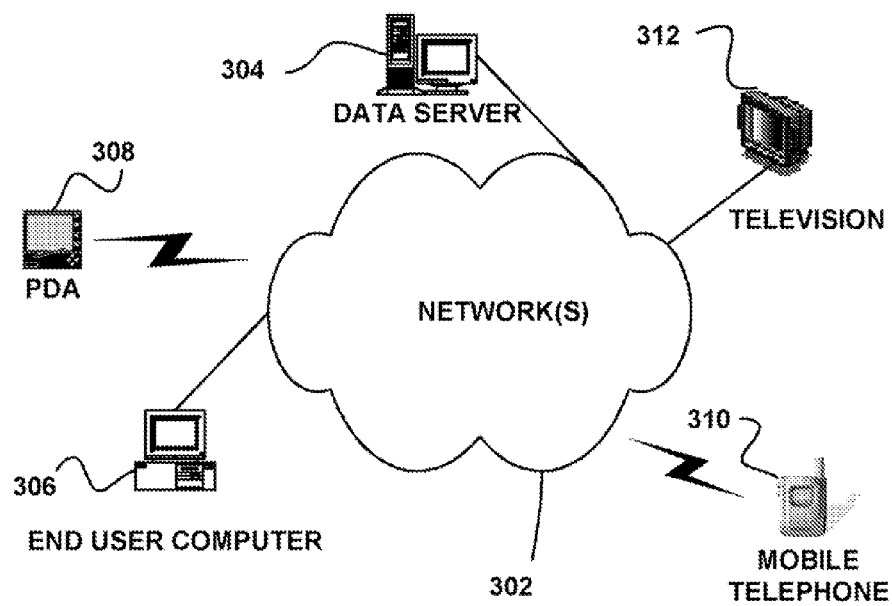
FIG. 3 illustrates a network architecture, in accordance with one embodiment.

FIG. 3 illustrates a network architecture 300, in accordance with one embodiment. As an option, the network architecture 300 may be implemented in the context of the details of FIGS. 1-2. Of course, however, the network architecture 300 may be carried out in any desired environment. Again, the aforementioned definitions may equally apply to the description below.

As shown, at least one network 302 is provided. In the context of the present network architecture 300, the network 302 max take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 302 may be provided.

Coupled to the network 302 is a plurality of devices. For example, a server computer 304 and an end user computer 306 may be coupled to the network 302 for communication purposes. Such end user computer 306 may include a desktop computer, lap-top computer, and/or any other type of logic. Still yet, various other devices may be coupled to the network 102 including a personal digital assistant (PDA) device 308, a mobile phone device 310, a television 312, etc.

Figure 4:
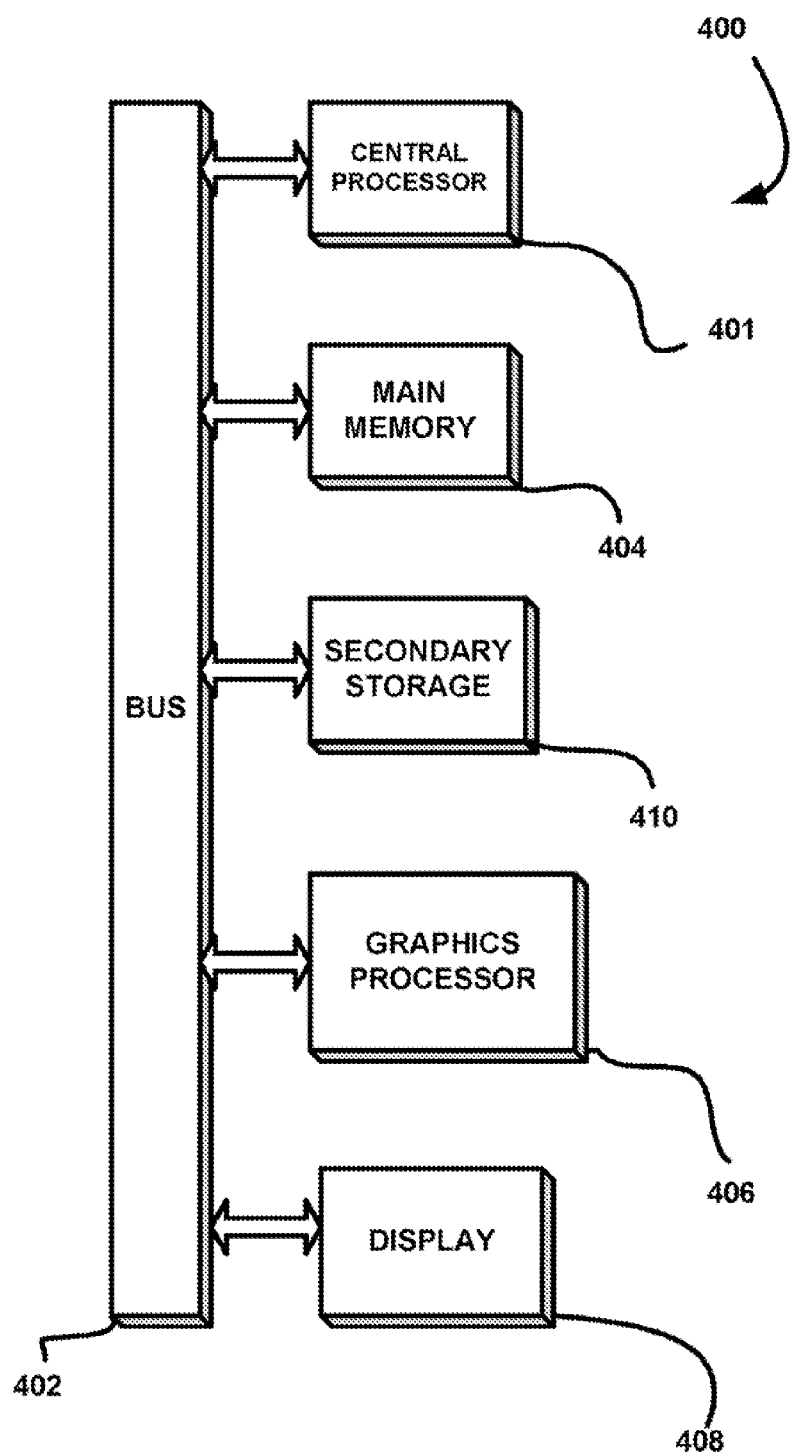
FIG. 4 illustrates an exemplary computer system, in accordance with one embodiment.

FIG. 4 illustrates an exemplary computer system 400, in accordance with one embodiment. As an option, the computer system 400 may be implemented in the context of any of the devices of the network architecture 300 of FIG. 3. Of course, the computer system 400 may be implemented in any desired environment.

As shown, a computer system 400 is provided including at least one central processor 401 which is connected to a communication bus 402. The computer system 400 also includes main memory 404 [e.g. random access memory (RAM), etc.]. The computer system 400 also includes a graphics processor 406 and a display 408.

The computer system 400 may also include a secondary storage 410. The secondary storage 410 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 404 and/or the secondary storage 410. Such computer programs, when executed, enable the computer system 400 to perform various functions. Memory 404, storage 410 and/or any other storage are possible examples of computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:
1. A computer-implemented method, comprising:
receiving, from a user, at least one parameter including an identifier that identifies at least one contact out of a plurality of contacts;
receiving at least one operator selected by the user for application to the at least one parameter including the identifier of the at least one contact;
generating a first contact set based on the at least one parameter and the at least one operator;
saving, in a local address book of the user from which the at least one parameter and the at least one operator are received, the at least one parameter including the identifier of the at least one contact and the at least one operator in association with an expression identifier;
receiving a command to modify the at least one contact out of the plurality of contacts;
modifying the at least one contact based on the command;
subsequent to the modification of the at least one contact, receiving a selection of the expression identifier; and
generating a second contact set different from the first contact set, in response to the selection of the expression identifier, wherein the difference between the first contact set and the second contact set results from the application of the at least one operator to the at least one parameter including the identifier of the modified at least one contact;

wherein the expression identifier is in association with an expression that includes the at least one parameter including the identifier of the at least one contact and the at least one operator.

2. The method of claim 1, wherein the identifier includes a group identifier associated with a group of which the at least one contact is a member.

3. The method of claim 2, wherein the group identifier includes a geographic location associated with the at least one contact.

4. The method of claim 2, wherein the group identifier includes a team of which the at least one contact is a member.

5. The method of claim 1, wherein the at least one operator includes a logical operator.

6. The method of claim 5, wherein the at least one operator includes a union operator.

7. The method of claim 5, wherein the at least one operator includes an intersection operator.

8. The method of claim 5, wherein the at least one operator includes a NOT operator.

9. The method of claim 5, wherein the at least one operator includes parentheses.

10. The method of claim 5, wherein the at least one operator includes a Boolean operator.

11. The method of claim 1, wherein the at least one operator is selected from a plurality of operators.

12. The method of claim 11, wherein each of the operators has a priority associated therewith.

13. The method of claim 12, wherein a plurality of the operators are applied to a plurality of the parameters based on the priority.

14. The method of claim 1, wherein the at least one parameter and the at least one operator are selected by the user, utilizing a graphical user interface.

15. The method of claim 1, wherein the first contact set is utilized for transmitting a communication utilizing a medium including one of an electronic message, an instant message, and a verbal message.

16. The method of claim 1, wherein a plurality of operators and a plurality of parameters are received and the plurality of operators are sequentially applied to the plurality of parameters.

17. The method of claim 1, wherein a plurality of operators and a plurality of parameters are received and the plurality of operators are applied to the plurality of parameters utilizing a tree structure.

18. The method of claim 17, wherein a root of the tree structure includes one of the plurality of operators of highest priority, such that branches of the root are computed prior to the root being computed.

19. The method of claim 1, wherein the expression is saved in a main address book accessible to a plurality of users within a specific network for public use by each of the plurality of users in generating the second contact set.

20. The method of claim 1, wherein prior to generating the second contact set, a resulting contact set is displayed based on the expression identifier.

21. The method of claim 1, wherein in response to the selection of the expression identifier, the first contact set is queried for modifications and the second contact set is generated based on the modifications.

22. The method of claim 1, wherein the command to modify the at least one contact out of the plurality of contacts includes removing the at least one contact from the plurality of contacts.

23. The method of claim 1, wherein the command to modify the at least one contact out of the plurality of contacts includes changing the at least one parameter including the identifier of the at least one contact.

24. The method of claim 1, further comprising providing the second contact set to the user and receiving a command from the user to remove a particular contact from the second contact set.

25. The method of claim 1, further comprising, in response to a determination that the second contact set does not include any contacts, generating an error message to the user.

26. The method of claim 1, wherein the expression that includes the at least one parameter including the identifier of the at least one contact and the at least one operator includes:
   a first parameter including a first identifier that identifies at least one first contact out of the plurality of contacts,
   a second parameter including a second identifier that identifies at least one second contact out of the plurality of contacts,
   a first operator including a first Boolean operator for application to at least one of the first parameter including the first identifier of the at least one first contact and the second parameter including the second identifier of the at least one second contact, and
   a second operator including a second Boolean operator for application to at least one of the first parameter including the first identifier of the at least one first contact and the second parameter including the second identifier of the at least one second contact.

27. A computer program product embodied on a non-transitory computer readable medium, comprising:
   computer code for receiving, from a user, at least one parameter including an identifier that identifies at least one contact out of a plurality of contacts;
   computer code for receiving at least one operator selected by the user for application to the at least one parameter including the identifier of the at least one contact;
   computer code for generating a first contact set based on the at least one parameter and the at least one operator;
   computer code for saving, in a local address book of the user from which the at least one parameter and the at least one operator are received, the at least one parameter including the identifier of the at least one contact and the at least one operator in association with an expression identifier;
   computer code for receiving a command to modify the at least one contact out of the plurality of contacts;
   computer code for modifying the at least one contact based on the command;
   computer code for, subsequent to the modification of the at least one contact, receiving a selection of the expression identifier;
   computer code for generating a second contact set different from the first contact set, in response to the selection of the expression identifier, wherein the difference between the first contact set and the second contact set results from the application of the at least one operator to the at least one parameter including the identifier of the modified at least one contact;
   wherein the computer program product is operable such that the expression identifier is in association with an expression that includes the at least one parameter including the identifier of the at least one contact and the at least one operator.

28. A computer-implemented method, comprising:
   receiving an expression; and
   generating a first contact set from a plurality of contacts utilizing the expression;

saving, in a local address book of a user from which the expression is received, at least one parameter and at least one operator of the expression in association with an expression identifier, the at least one parameter including an identifier that identifies at least one contact out of the plurality of contacts;

receiving a command to modify the at least one contact out of the plurality of contacts;

modifying the at least one contact based on the command;

subsequent to the modification of the at least one contact, receiving a selection of the expression identifier; and generating a second contact set different from the first contact set, in response to the selection of the expression identifier, wherein the difference between the first contact set and the second contact set results from the application of the at least one operator to the at least one parameter including the identifier of the modified at least one contact;

wherein the expression identifier is in association with an expression that includes the at least one parameter including the identifier of the at least one contact and the at least one operator.

* * * * *